(12) United States Patent
Glidewell et al.

(10) Patent No.: US 8,700,669 B1
(45) Date of Patent: Apr. 15, 2014

(54) TECHNIQUES FOR DATA STORAGE SYSTEM MANAGEMENT (75) Inventors: Keith John Glidewell, Chapel Hill, NC (US); Michael Bassily, Durham, NC (US); Jeffrey Brown, Shrewsbury, MA (US); Brian Tetreault, Framingham, MA (US); Stephen Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 649 days.

(21) Appl. No.: 12/653,790

(22) Filed: Dec. 21, 2009

(51) Int. Cl.
*G06F 17/30* (2006.01)

(52) U.S. Cl.
CPC .................................. *G06F 17/30607* (2013.01)
USPC ........... 707/793; 707/791; 707/792; 707/794; 707/795; 707/796; 707/802; 455/422.1; 370/328; 463/42; 711/103; 711/170; 717/100

(58) Field of Classification Search
USPC ............ 707/791–796, 802, 999.1; 455/422.1; 370/328; 711/103, 170; 717/100
See application file for complete search history.

(56) References Cited

U.S. PATENT DOCUMENTS

| 2003/0229752 | A1* | 12/2003 | Venkiteswaran | 711/103 |
| 2005/0086630 | A1* | 4/2005 | Chefalas et al. | 717/100 |
| 2008/0200255 | A1* | 8/2008 | Eisele | 463/42 |
| 2010/0087184 | A1* | 4/2010 | Stoev et al. | 455/422.1 |

OTHER PUBLICATIONS

U.S. Appl. No. 12/286,427, filed Sep. 29, 2008, Tetreault, et al.
U.S. Appl. No. 12/286,442, filed Sep. 29, 2008, Tetreault, et al.

* cited by examiner

*Primary Examiner* — Syling Yen
(74) *Attorney, Agent, or Firm* — Muirhead and Saturnelli, LLC (57) ABSTRACT Described are techniques for obtaining information about a data storage system. Boot code is executed on the data storage system and determines whether a flag is set. If the flag is set, an agent is executed which communicates with a central location at predetermined time intervals. At a first predetermined time interval, a first message is sent to the central location polling for a pending work item. If there are any work items pending for the data storage system, first processing is performed which includes sending a second message to the data storage system indicating whether there are any pending work items for the data storage system and including at least one work item if there are any pending work items. The at least one work item describes second processing to obtain first information about a state of the data storage system.

20 Claims, 8 Drawing Sheets

TECHNIQUES FOR DATA STORAGE SYSTEM MANAGEMENT

BACKGROUND

1. Technical Field

This application generally relates to data storage, and more particularly to techniques used in connection with data storage management.

2. Description of Related Art

Computer systems may include different resources used by one or more host processors. Resources and host processors in a computer system may be interconnected by one or more communication connections. These resources may include, for example, data storage devices such as those included in the data storage systems such as data storage arrays manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system such as for data storage system management and service. An interface may be provided which allows the customer to perform certain management operations and commands. However, using this interface, the customer may be allowed to perform only a limited range of operations and tasks. Customers may not be provided with an interface or other mechanism to perform more sophisticated and advanced operations for data gathering regarding the state of the data storage system, diagnostics, reporting, and the like, as more typically performed by a skilled service technician. Information obtained from the latter operations as more typically performed by the skilled service technician may aid in many serviceability aspects such as problem diagnosis and correction. Access to an interface for performing the latter operations may be available only to a skilled service technician who may be logged into an individual data storage system such as through a login and interface not available to the customer.

SUMMARY OF THE INVENTION

In accordance with one aspect of the invention is a computer implemented method for obtaining information about a data storage system. The data storage system is booted by executing boot code. The boot code determines whether a flag has a first setting indicating that information is to be gathered about said data storage system. If the flag has the first setting, an agent is executed on the data storage system. The agent is configured to communicate with a central location at predetermined time intervals. At a first predetermined time interval, a first message is sent from said agent to the central location polling for a pending work item. If there are any work items pending for the data storage system, first processing is performed. The first processing includes: sending, by said central location to the data storage system in response to the first message, a second message indicating whether there are any pending work items for the data storage system, said second message including at least one work item if there are any pending work items for the data storage system, said at least one work item describing second processing to obtain first information about a state of the data storage system; performing, by the data storage system, said second processing; and sending, to the central location, work item results including said first information produced by performing said second processing. The flag may be a hardware flag of the data storage system. The at least one pending work item may be a request to execute code on the data storage system to obtain at least one data item about the state of the data storage system. The at least one pending work item may include a script for execution by the data storage system. The central location may include a system with a computer processor and a plurality of software layers, said plurality of software layers including a first interface layer that interfaces with a user, a second data container layer that stores data, and a third layer including code facilitating communications with said agent. The data container layer may be used for storing data including a work item queue for a plurality of registered data storage systems including said data storage system, and results of performing work items where said results are reported from agents of said registered data storage systems. The data container layer may be used for storing data including information identifying each of the plurality of registered data storage systems. The data container layer may be used for storing data including one or more defined data storage system groups, each of said defined data storage system groups including a group definition identifying which of said plurality of registered data storage system are members of said each defined data storage system group. The first interface layer may include code that generates a work item in response to a user-initiated request and places said work item on a work item queue in said data container layer. The third layer may include code that automatically generates a work item and places said work item on a work item queue in said data container layer. The work item may be included on a first work item queue for said data storage system and may be generated in response to analyzing first results returned by said agent executing on the data storage system, said first results produced by said data storage system performing processing for one or more other work items previously sent to, and processed by, said data storage system. Analyzing said first results may be performed by the central location and may indicates a problem with the data storage system. The first work item may include a request for the data storage system to automatically perform a corrective action in accordance with said analyzing said first results. The corrective action may include at least one of: reboot the data storage system, reinitialize the data storage system, install a software patch on the data storage system, and install a different version of software on the data storage system. The third layer may receive messages from agents inquiring whether there are any pending work items for data storage systems, retrieve one or more pending work items from said data container layer for a specific data storage system as requested by an agent on said specific data storage system, and send said one or more pending work items to a the agent on said specific data storage system. The second processing for said at least one work item may include obtaining information about one or more of status of a device of the data storage system, a computer processor which is a service processor of the data storage system, a version of software installed on the data storage system, a patch installed on the data storage system, and a hardware characteristic about a device of the data storage system. The second processing for said at least one work item may include obtaining information about one or more of: logins to said data storage system, usage information about a device of the data storage system, usage information about a computer processor of the data storage system, errors or alerts received for a device of the data storage system, whether a device is available for use, and device age. The data storage system may be registered with said central location as having a license for servicing said data storage system.

In accordance with another aspect of the invention is a computer readable medium comprising executable code stored thereon for obtaining information about a data storage system, the computer readable medium comprising executable code stored thereon that: boots the data storage system by executing boot code; determines, by said executing boot code, whether a flag has a first setting indicating that information is to be gathered about said data storage system; if said flag has said first setting, executes an agent on the data storage system, said agent being configured to communicate with a central location at predetermined time intervals; at a first predetermined time interval, sends a first message from said agent to the central location polling for a pending work item; and if there are any work items pending for the data storage system, performs first processing, said first processing including executable code that: sends, by said central location to the data storage system in response to the first message, a second message indicating whether there are any pending work items for the data storage system, said second message including at least one work item if there are any pending work items for the data storage system, said at least one work item describing second processing to obtain first information about a state of the data storage system; performs, by the data storage system, said second processing; and sends, to the central location, work item results including said first information produced by performing said second processing. The flag may be a hardware flag of the data storage system. The at least one pending work item may be a request to execute code on the data storage system to obtain at least one data item about the state of the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
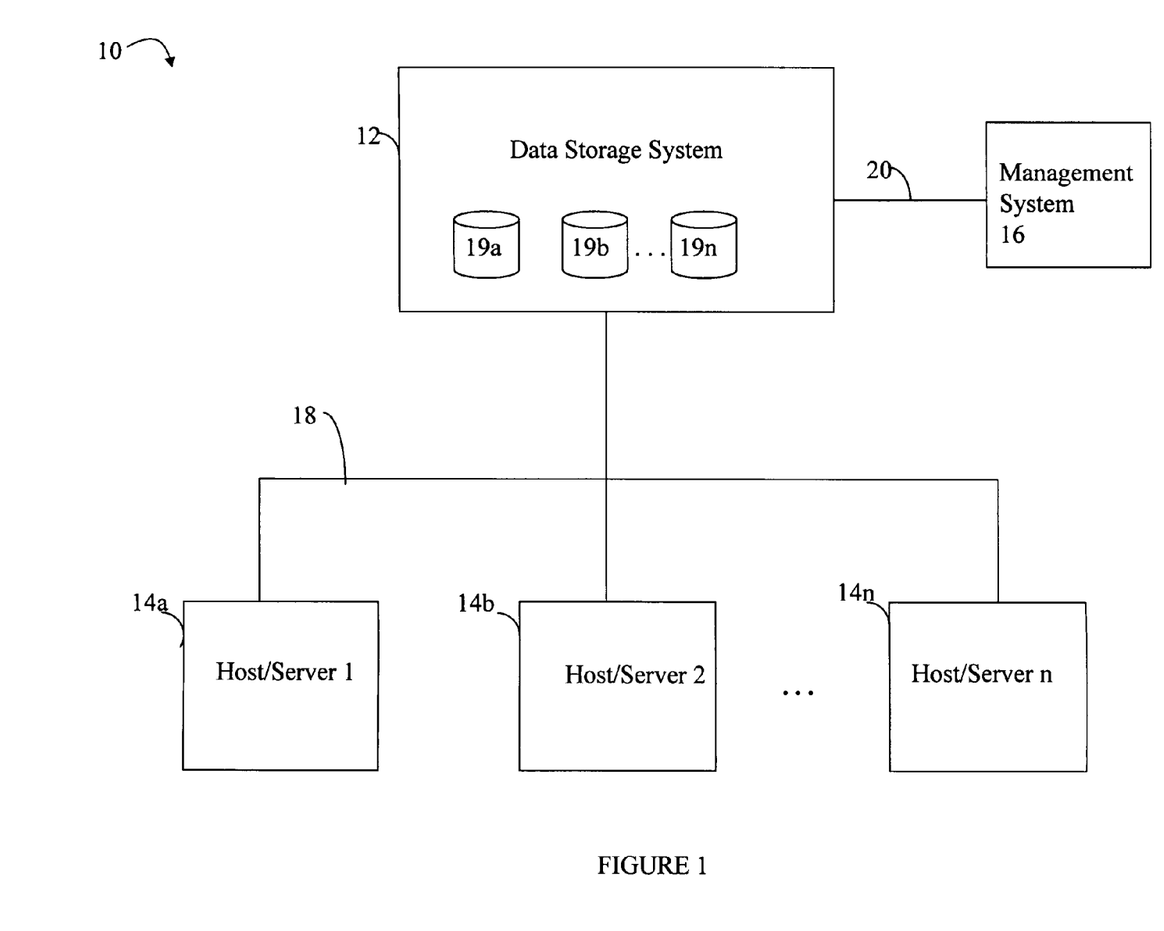
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The data storage systems 12 may include one or more storage devices 19a-19n. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or Fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices 19a-19n, such as disks, solid state devices, and the like. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein in following paragraphs.

Servers or host systems, such as 14a-14n, provide data and access control information through channels to the storage systems, and the storage systems may also provide data to the host systems also through the channels. The host systems may not address the drives 19a-19n, such as disk drives, of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are techniques that may be used to assist in connection with gathering information about one or more data storage systems and reporting such information to a central location, such as central computer system. The techniques may be used, for example, by a VAR (value added reseller) of data storage systems where the VAR may sell data storage systems to his/her customers. The VAR may also provide servicing of the data storage systems for these customers. As part of the servicing, the techniques herein may be used to provide for automated gathering of information from the data storage systems where the information may be reported, stored and/or analyzed on a VAR's central computer system. As will be appreciated by those skilled in the art, the foregoing is one example of how the techniques herein may be used. As another example, the techniques herein may be used within a single customer's internal network (e.g., LAN) having multiple data storage systems where information about the multiple data storage systems may be gathered using the techniques herein and reported to a central computer system of the customer also within the LAN. The VAR may set up the foregoing within the customer's own LAN in order to provide for gathering information about the customer's data storage systems. The VAR may then use the information gathered and reported to the central computer system. More generally, the techniques herein may be used in an embodiment where there are one or more data storage systems having some form of connectivity, such as via network, direct connection, and the like, to a central location. The central location may be a computer system (as described above) as well as another component (e.g., another data storage system, appliance) having connectivity to the data storage systems.

The information that may be gathered about a data storage system using techniques herein may be characterized as data about a current data storage system state and may be related to various aspects of serviceability, manufacturing and/or engineering. The information gathered may include state information about the data storage system generally and/or also about the storage devices, CPUs, DAs and other components of the data storage system. The information may also relate to aspects of data storage system environment and usage, and also usage and performance characteristics of particular devices and other components of the data storage system. For example, the information gathered may include a firmware level or revision, BIOS level, operating system or other software revision information (including version information, patch level), and the like, currently on the data storage system, problem information including hardware and/or software errors or alerts that have occurred over a period of time (e.g., for the data storage system or for a particular device or component thereof), an indication regarding hardware and/or software problems of a particular component such a particular storage device or drive, whether and when a data storage system has been rebooted, powered down, taken offline, reinitialized, whether and when a device has been replaced, age of a device, device hardware characteristics, information related to device and CPU health and status, history regarding logins to a data storage system, when particular users were logged in, what operations regarding management were performed, frequency of different types of management operations and/or commands, network connectivity information (e.g., periods of time that the data storage system may have been disconnected from a SAN or other network), power level of a battery or other backup power supply, software application(s) and associated versions running on a data storage system, device performance characteristics, and the like.

In an existing system not utilizing the techniques herein, the foregoing information gathered about one or more data storage systems may be more typically accessible and provided to a service technician such as through a special login for an onsite service call. The customer of the data storage system may not have knowledge of the special login or otherwise be able to access and obtain such information. Furthermore, a customer purchasing a data storage system may not know how such information may be used in connection with performing service operations, system diagnostics, preventive maintenance recommendations, and the like. Thus, an embodiment in accordance with techniques described in following paragraphs may provide for efficiency, flexibility, and automation in connection with information reporting, analysis and other information processing operations for one or more data storage systems. Such information gathered using techniques herein may be used in connection with, for example, determining a state of a data storage system, performing diagnostics, and more, generally used to aid in many serviceability aspects such as preventive maintenance, problem diagnosis and/or correction.

Figure 2A:
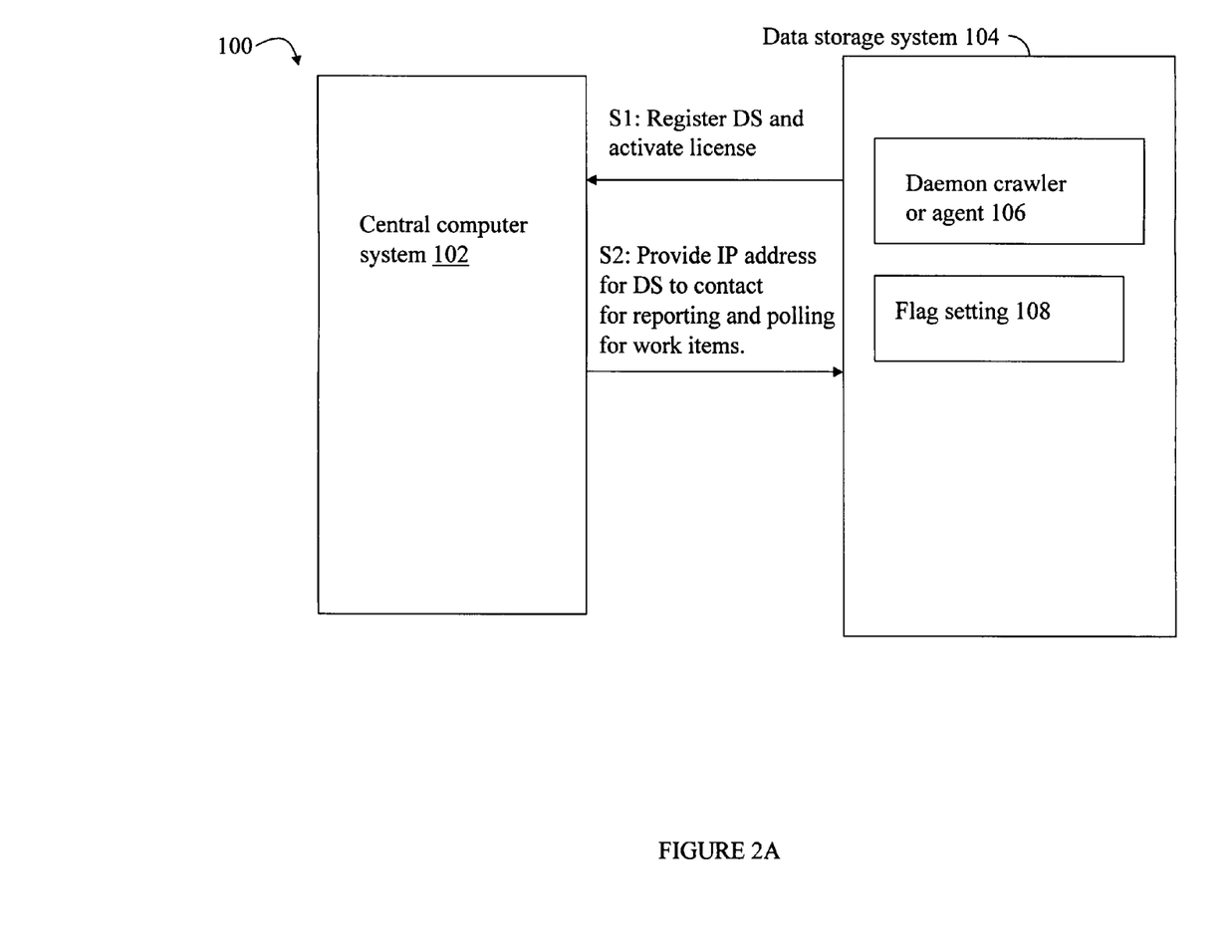
FIGS. 2A, 2B and 7 are examples illustrating messages that may be transmitted between a central location and a data storage system in an embodiment in accordance with techniques herein.

Referring to FIG. 2A, shown is an example of components that may be included in an embodiment in accordance with techniques described herein. The example 100 includes a central computer system 102 and a data storage system 104. The example 100 also illustrates processing that may be performed in connection with registration of data storage system 104 such as through license activation. The systems 102 and 104 may have connectivity to one another such as through a network or other type of suitable communication connection. It should be noted that the example 100 includes only a single data storage system for purposes of simplicity of illustrating the techniques herein. However, an embodiment may more generally include any number of data storage systems having connectivity to the central computer system 102 where each such data storage system may have components and functionality as described herein in connection with system 104. The system 102 is illustrated as a computer system. More generally, the system 102 is not limited to a computer system and may be another data storage system or another component which has connectivity to the data storage system 104 and is configured to perform the techniques described herein.

The data storage system 104 may include a daemon crawler or agent 106. In one embodiment, the agent 106 may be implemented using one or more scripts. The data storage system 104 also includes a flag setting 108. The flag setting 108 may be a hardware flag setting or other indicator internally set and stored within the data storage system 104 so that the flag retains its state when the data storage system 104 is rebooted, loses power, and the like (e.g., flag setting is non-volatile). The flag setting 108 indicates whether or not the techniques herein are to be used in connection with the data storage system. The setting 108 indicates whether the data storage system 104 is to be enabled to utilize the techniques herein for information gathering, reporting, and the like. When the data storage system boots, the flag 108 is examined to see whether it is set (e.g., indicating that techniques herein are to be used in connection with the data storage system), or otherwise. If the flag 108 is set indicating that techniques herein are to be used in connection with the data storage system, the agent 106 may be started thereon.

As will be described in following paragraphs, the agent 106 facilitates communications with the system 102 for information gathering and reporting. If the data storage system 104 is not already registered with the system 102 such as by having a license activated, the agent 106 (or other component) may facilitate this operation as indicated by S1. In one embodiment, the techniques herein may be performed as part of a licensed service for the data storage system 104. A customer may receive an electronic license code (e.g., combination of letters and digits) and possibly other information. The first time the agent 106 is started, the agent may communicate with the system 102 to activate the license and to register the data storage system 104 with the system 102. Registration of the data storage system 104 may include, for example, updating a database or other data container on the system 102 to include identifying information of data storage system 104. Such identifying information may be provided by the agent 106 as part of S1 and may include, for example, a data storage system identifier (e.g., serial number), IP address of the system 104, timestamp, and the like. In response as illustrated by S2, the computer system 102 may provide an IP address that the agent 106 of the data storage system uses as a point of contact for communications in connection with the techniques herein. The IP address transmitted from 102 to 104 may be an IP address of a port on the computer system 102 with which the agent communicates. Information regarding registration and license activation (e.g., indicating that registration has been completed, the IP address of port of 102 with which the agent 106 communicates) returned to the data storage system may be stored in a form of non-volatile storage so that such information may be available, for example, when the system 104 reboots.

Each of S1 and S2 may include one or more messages exchanged between the systems 102 and 104. For example, each of steps S1, S2 as well as others described in connection with other figures may include an initial message and a return acknowledgment or response. FIG. 2A illustrates processing (S1 and S2) that may be performed as part of license activation as described above the first time the agent 106 is executed. Once the data storage system 104 is registered with the central computer system 102 such as via license activation, the agent 106 may perform processing to facilitate further communications with the system 102 in accordance with techniques herein.

It should be noted that if the data storage system 104 is booting up and registration with the system 102 has been previously completed prior to booting, the agent 106 (or other software) may omit the foregoing processing as illustrated in FIG. 2A related to registration and license activation and execution of the agent 106 may still be commenced.

The foregoing registration and license activation may be performed independent of (e.g., not as part of) booting the data storage system 104 in an embodiment in accordance with techniques herein. For example, an embodiment may boot the data storage system 104. As part of booting 104, the agent 106 may be started if the flag 108 is set indicating that the techniques herein are to be performed with respect to 104. At a later point in time, a user such as a data storage administrator, may log into the system 104 and register the data storage system 104 with the computer 102 such as through license activation.

The above illustrates that the registration of the data storage system 104 in connection with techniques herein may be performed electronically over a communication connection between 102 and 104 using a license. As will be appreciated by those skilled in the art, such registration may be performed using other techniques.

Figure 2B:
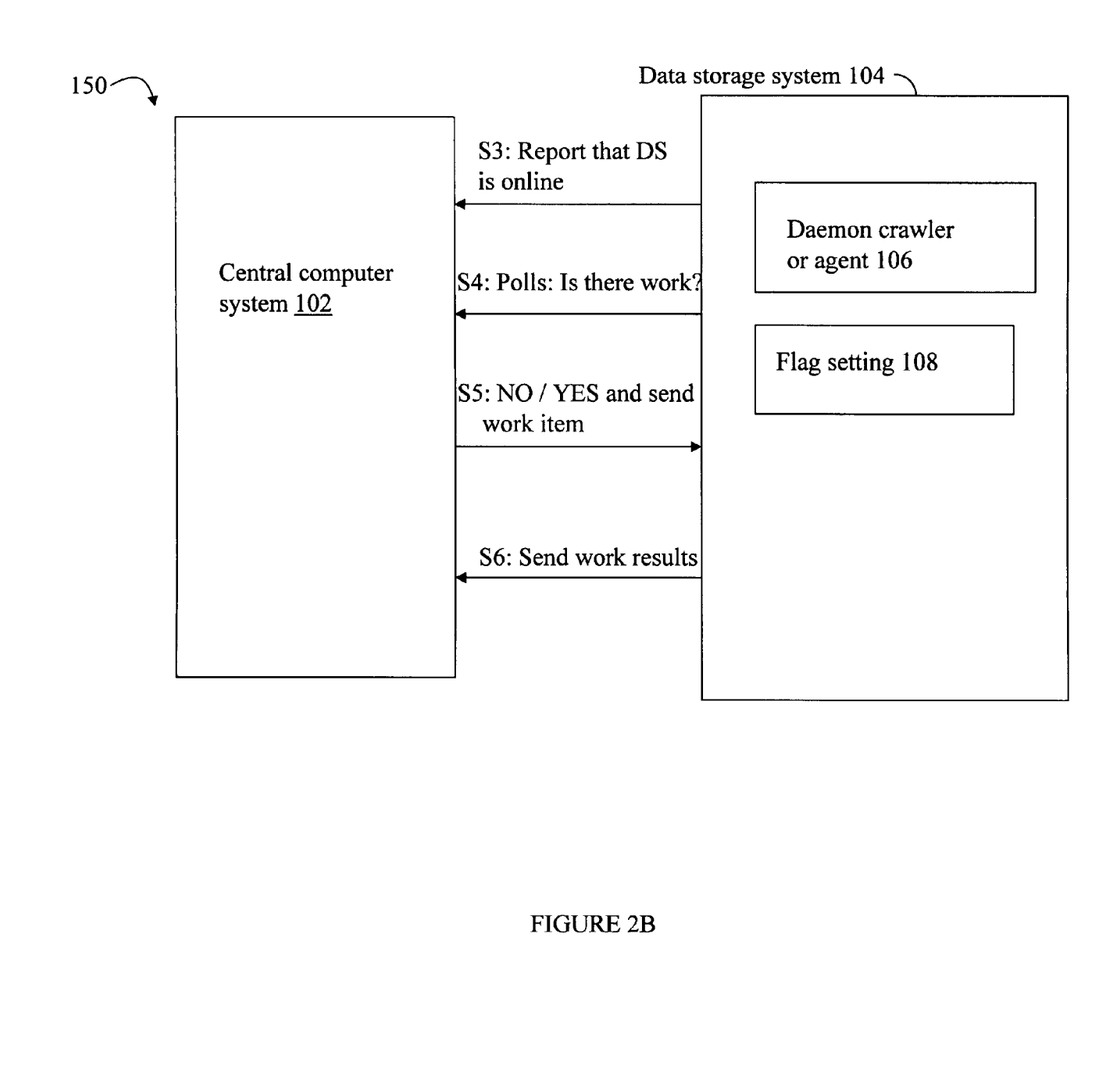

Referring to FIG. 2B, shown is an example of the components of FIG. 2A and illustrating additional processing that may be performed in connection with techniques herein once registration of data storage system 104 is completed. For this example 150, assume that the data storage system 104 has already registered with the system 102 and the data storage system is now being rebooted. As described above, information such as the IP address used for communications in performing techniques herein may be retrieved from non-volatile memory or other storage. The IP address to which the agent 106 sends and/or receives transmissions in connection with techniques described herein may identify a port of the system 102 which was previously saved as a result of the registration and license activation processing of FIG. 2A. As part of booting 104, the boot code examines the flag setting 108 to determine whether the techniques herein for gathering information about the data storage system 104 are to be performed. If the flag setting 108 has a value indicating that techniques herein are to be performed with respect to the data storage system 104, execution of the agent 106 is commenced. Otherwise, the boot process continues.

If the agent is started, the agent 106 performs step S3 by sending a message to the system 102 that the data storage system 104 has been booted and is currently online. The computer system 102 may update status information regarding 104 to indicate that data storage system 104 is currently online and active.

At some later point in time as illustrated by S4, the agent 106 may send a message to the system 102 polling or inquiring as to whether there is any work item or task to be performed by the agent 106 on the data storage system 104. The agent 106 may perform such a query as illustrated by S4 at predefined polling intervals or time periods.

Although S3 and S4 are illustrated as two separate transmissions from 104 to 102, an embodiment may combine functionality of S3 and S4 into a single transmission. Thus, the initial or first request S4 for work may be implied when S3 is sent from 104 to 102. Thereafter, the data storage system 104 may poll the computer system 102 periodically for work. Such polling may occur at predetermined fixed intervals.

The system 102 may respond to the received transmission of S4 querying for work items with a response transmission as illustrated by S5. The response of S5 sent from 102 to 104 may indicate that either yes there is a pending work item, or there is no pending work item(s). Additionally, if there is a pending work item, the computer system 102 may send the work item to be performed by the agent 106 with the response transmission of S5. The work item transmitted may include a script or other code executed by the agent 106 to perform processing for the work item. The work item transmitted may also include another form of work description, such as a set of rules, which describe the work item processing steps. The agent 106, alone or optionally in combination with other software (e.g., rule processing software/system) of the data storage system 104, may use the work item information transmitted in connection with S5 to perform work item processing. At step S6, the results of the work item processing are transmitted by the agent 106 to the computer system 102. Step S6 may include the agent 106 transmitted the foregoing results which may include, for example, statistical information, status information about a component of the data storage system, usage information, and the like. The transmission of S6 may also include information identifying the data storage system 104 (e.g., data storage system serial number), identifying the particular results set (e.g., timestamp), and the like.

The work item on the system 102 pending for an agent of a particular data storage system may be a general work item request. For example, the system 102 may send a same request to all data storage systems when their agents perform step S4. The work item for a data storage system may also be customized for that particular data storage system. For example, a first set of information may be gathered at a first point in time via a general work item request. The computer system 102 may analyze the gathered information or results of the first work item and generate a second work item customized or based on the analysis. For example, the second work item may be to gather additional information regarding a problem (potential or current) determined on the data storage system due to the analysis of the first work item results. As another example, the second work item may be a request for the data storage system 104 to perform processing for a corrective action to correct the problem determined from analyzing the first work item results transmitted by the agent 106. Such corrective actions may include, for example, instructions to reboot or reinitialize the data storage system 104, automatically downloading and/or installing a software patch, later version of software, and the like. In connection with this latter example, the data transmitted as part of S5 may include the actual code for the patch or software upgrade, instructions for where and how to obtain the code for download and installation, and the like. Additional examples of work items are described in more detail elsewhere herein.

In one embodiment, the agent 106 may be a Perl script which executes as a privileged process in order to perform requested work item processing. As will be described in more detail in following paragraphs, the computer system 102 may include web services defined in accordance with an interface or protocol such as SOAP (Simple Object Access Protocol) and the agent 106 may issue APIs defined in accordance with the web services interface provided by the system 102. The agent 106 may communicate with the computer system 102 over a secure connection, such as using HTTPS, the Secure Sockets Layer (SSL) protocol, and the like.

Processing illustrated by S4, S5 and S6 may be performed in response to an occurrence of each predetermined time interval triggering the agent 106 to issue the polling request of S4.

In connection with the foregoing, the system 102 may be characterized as a central system or location from which all work requests are issued and to which all work item results are reported. If there is an update to a script such as for a work item, the update may be made to a single copy of the script at the system 102. Thereafter, all work item requests which reference or use this script automatically use the updated script. Thus, updating the work item, or information about a work item, may be performed and stored at a single location (e.g., the system 102) and the revised script or other updated information may be propagated to each data storage system as referenced in connection with work items subsequently performed (e.g., after the update is made). The foregoing provides an advantage of updating processing for work item requests at a single location and having the updates propagated out to the data storage systems rather than updating information that may have been previously stored or installed at each data storage system.

Figure 3:
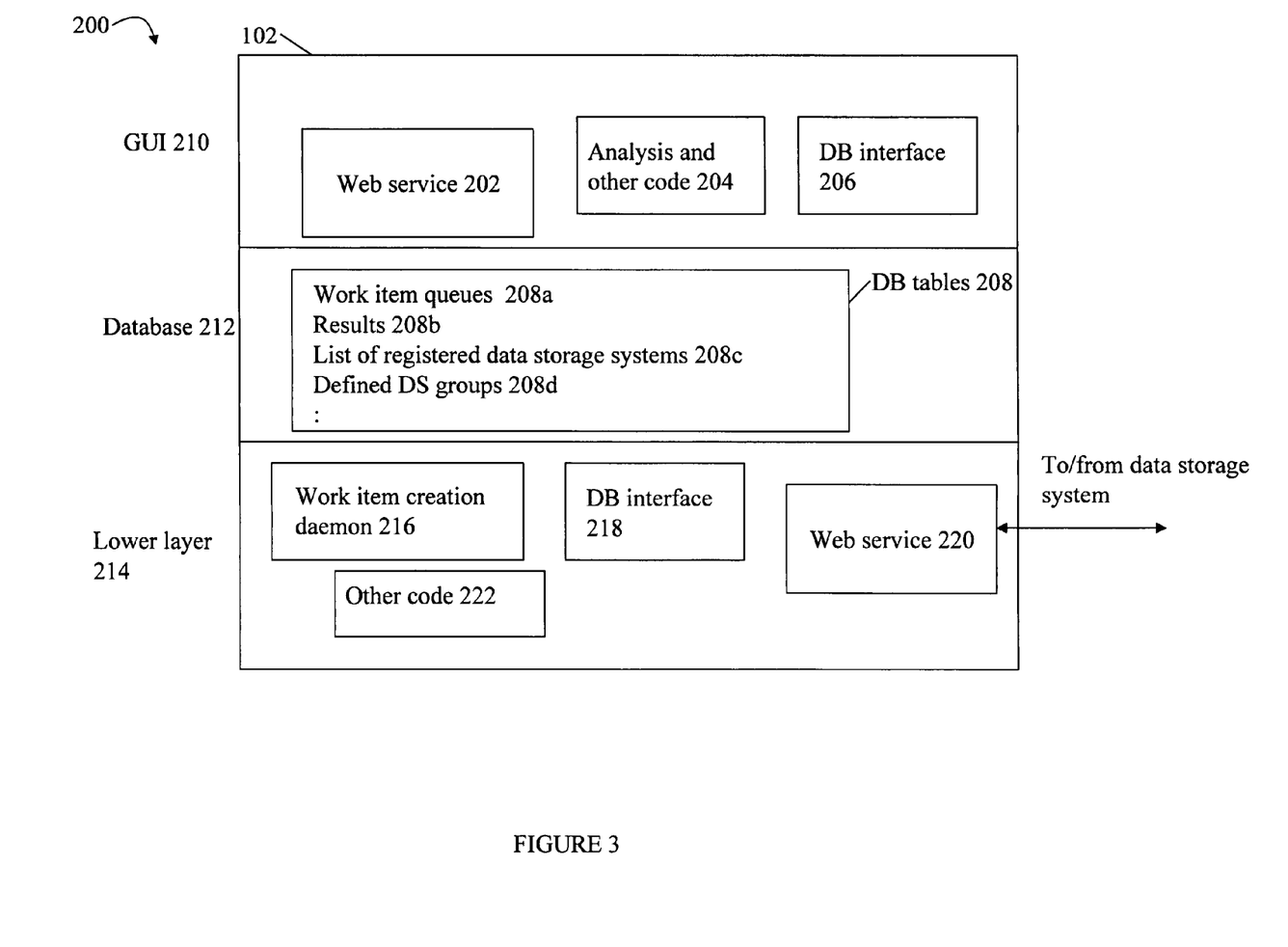
FIG. 3 is an example illustrating components that may be included in an embodiment of a central computer system in accordance with techniques herein.

Referring to FIG. 3, shown is an example illustrating components that may be included in an embodiment of the central computer system of FIGS. 2A and 2B in accordance with techniques described herein. The example 200 illustrates an embodiment of the central computer system including several layers of software: a GUI (graphical user interface) 210, a database 212, and a lower layer 214. The GUI 210 may be used to interface with a customer or user, such as a data storage administrator. The database 212 may be used to store and organize data used in connection with techniques described herein. For example, as will be described in more detail below, the database 212 may include information about what data storage systems are registered and from which data is reported to the computer system by an agent of the data storage system. It should be noted that a database is used for purposes of illustration in connection with techniques herein. More generally, any suitable data container may be used in connection with the techniques herein. For example, rather than a database 212, an embodiment in accordance with techniques herein may use a file system to store data in files, folders, and the like. The lower layer 214 may be used to facilitate communications with the data storage systems and agents executing thereon.

The GUI 210 may include code for a web service 202, code for performing analysis and other operations 204, and a database (DB) interface 206. The web services 202 may include code, for example, for implementing an API used to interface with a user to perform operations such as display graphs and charts of collected data stored in 212, menus for display, and the like. The element 204 may generally represent code that performs analysis as well as other processing operations. For example, element 204 may include code which analyzes information from the database 212 in response to user entered queries, as part of displaying analysis results to a user, and the like. For example, element 204 may include code that determines when someone was last logged into a specified data storage system, analyzes information from 212 to determine whether and how frequently one or more data storage systems are being used (e.g., via logins, to store data, and the like), characteristics of data storage system activity, data storage system health (e.g., where health may be determined as one of healthy or unhealthy depending on alerts or errors generated for a data storage system, whether any devices of a data storage system are down, offline, or unavailable for storage). Element 204 may perform analysis of information from 212 to determine a profile regarding one or more data storage systems displayed to a user. For example, information of 212 may be analyzed to show the oldest hardware and/or software running across one or more data storage systems, to provide a profile of all hardware and software on all data storage systems and a percentage of particular hardware and/or software currently on all data storage systems, to show what percentage of data storage systems are healthy or unhealthy, to view a history of hardware or software versions for one or more particular data storage systems over a time period (e.g., how long a particular software version has been on a selected data storage system), to determine what percentage of all data storage systems are currently running operating system version X, have patch Y installed, have a particular combination of hardware and software version and are also in an unhealthy state, do not have patch Z installed and are in an unhealthy state, and the like. Element 204 may also include code to create a work item request for one or more data storage systems based on a request received from the user through the GUI 210. The database interface 206 may be used by the GUI layer 210 to interface with the database 212 such as, for example, to retrieve data for analysis.

The database 212 may include information organized into one or more database tables 208. In one embodiment, the database 212 may include work item queues 208a, results 208b, a list of registered data storage systems 208c, defined data storage groups 208d and other information. The work item queues 208a may include work item requests for each data storage system registered with the computer system. As noted above, the work items may be a user generated work item, such as a result of a user inputting data and/or making menu selections using the GUI 210. A user generated work items may be an unscheduled work request and may be performed on demand as soon as possible by the appropriate data storage system. Other work item requests, such as described below that may be generated by the lower layer 214, may be scheduled work item requests such as for each data storage system to run a particular script every 24 hours, every week, and the like. The results 208b may be stored per registered data storage system and may include the information as reported by the agent of the particular data storage system. The results 208b may include one or more sets of results information as reported over a period of time for one or more data storage systems. The list of registered data storage system 208c may include information identifying each data storage system which has completed registration with the computer system of FIG. 3 (e.g., each data storage system which has completed execution of processing described in connection with FIG. 2A). Information of 208c for each registered data storage system may include, for example, a serial number for the registered data storage system and an IP address or WWN (world wide name) of the data storage system, or component thereof. Element 208d representing defined data storage system groups may more generally be characterized as one form of metadata about the data storage systems. For example, a named group 208d of data storage systems may be defined. A user of the GUI may specify a named group in connection with a request, for example, that one or more work items be performed for the specified named group. When a work item request is specified for the group, the work item request may be issued to all data storage systems currently listed as members of the group. Thus, a change to membership of the group affects which data storage systems are sent the foregoing work items in connection with requests issued with respect to the named group subsequent to the membership change.

The lower layer 214 may include a work item creation daemon 216, a database (DB) interface 218, web service 220 and other code 222. The daemon 216 may be code which runs at predetermined time intervals (e.g., every 30 minutes) and generates work items for one or more data storage systems. For example, the daemon 216 may generate a particular work item for all registered data storage systems to gather and report a defined set of information every 24 hours. The web services 220 may include code which facilitates communication with the agent 106 of each registered data storage system such as, for example, to transmit work items to the agent 106 and receive work item results reported by the agent 106. The DB interface 218 may include code used by other portions of the layer 214 to read, write, and otherwise perform operations on data of the database 212. For example, the daemon 216 may use the DB interface 218 to store work item requests. Element 222 may generally represent other code that may be used in connection with performing processing operations described herein. For example, element 222 may include code which parses and/or analyzes the work item results reported by an agent, communicates with the DB interface 218 to store reported work item results in the database 212, communicates with the daemon 216 to determine and create customized work item requests (e.g. such as in response to analysis of reported work item results for a particular data storage system), communicates with the DB interface 218 to retrieve work items from the database 212 for a data storage system, and the like.

As an exemplary operation in connection with the example 200 with reference to FIG. 2B, an agent 106 of a data storage system may send a message to the computer system polling for pending work items for the data storage system. Web service 220 may receive the request and communicate with 222 and 218 to retrieve the pending work items for the data storage system identified in the message. As another exemplary operation, the agent 106 may report results for a work item. The results may be received by web service 220 which, in turn, communicates with 222 and 218 to parse and store the results, and communicates with 222 which analyzes the results. Element 222, as a result of the analysis, may communicate with 216 and 218 to create and store a new work item for the data storage system. The analysis performed may indicate that a problem exists on the data storage system such as the data storage system is currently in an unhealthy state. Additional information may be needed for further analysis, such as whether a particular software patch is installed on the data storage system. As a result, one or more additional work items may be generated. A first new work item may be a request to obtain information regarding the current software patch level running on the data storage system. Upon receiving the results of the first new work item, analysis of the results may indicate that a particular patch is not installed on the data storage system. In response to the foregoing, a second new work item may be generated which includes a corrective action to attempt to change the data storage system state to healthy. The second new work item may be a request to install the patch. The second new work item may include the code, such as a script or a binary stream, for the patch itself. As an alternative, the second new work item may identify a location, such as an IP address, from which the patch may be downloaded and then installed.

It should be noted that FIG. 3 illustrates one way in which the techniques herein may be embodied. Another embodiment in accordance with techniques herein may partition functionality in a different manner than as illustrated. For example, an embodiment in accordance with techniques herein may have the web service 202 perform at least a portion of the functionality described herein as being performed by element 204.

What will be further illustrated are exemplary data flows that may be performed in an embodiment using the software of the computer system as illustrated in FIG. 3. It should be noted that details of FIG. 3 are omitted for simplicity of illustration.

Figure 4:
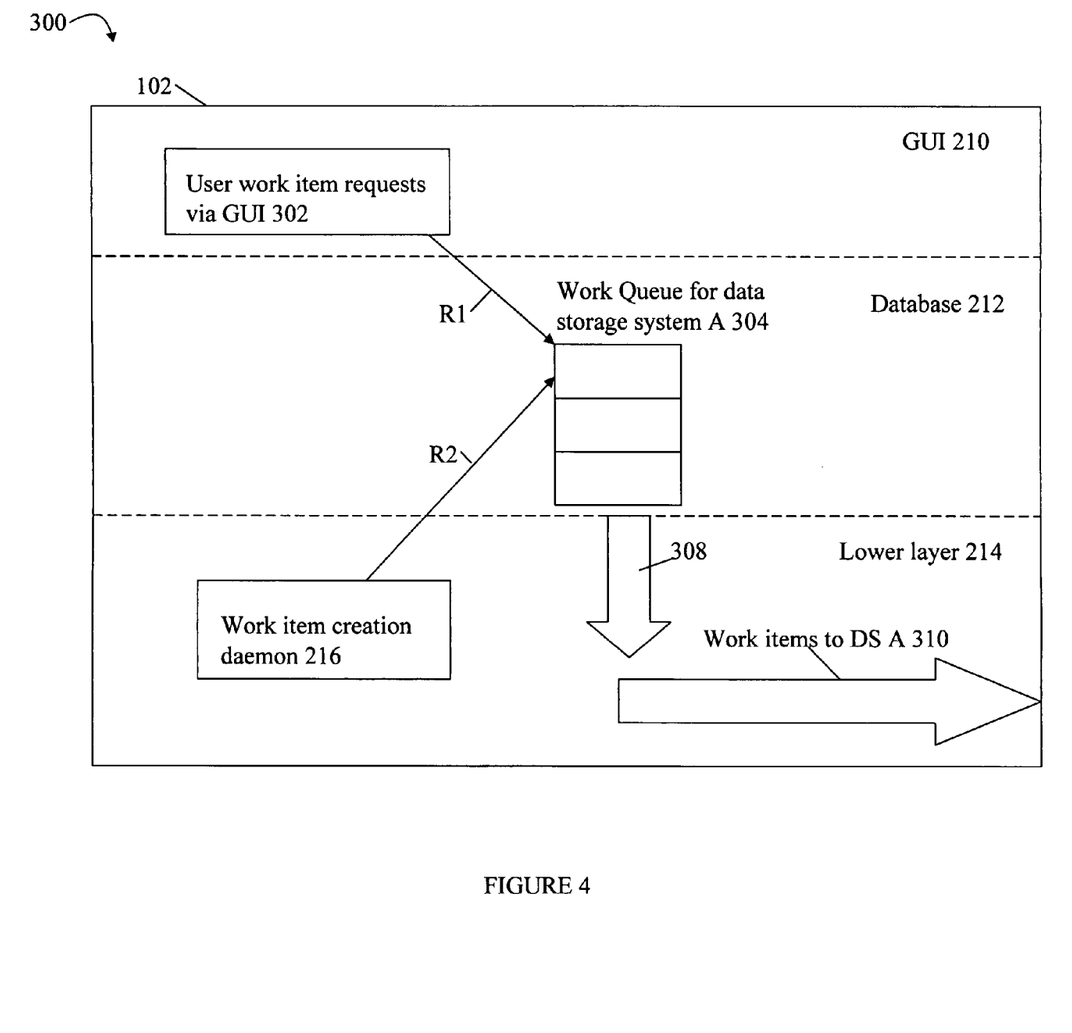
FIGS. 4 and 5 are examples illustrating data flow between components in an embodiment in accordance with techniques herein.

Referring to FIG. 4, shown is an example illustrating the data flow of work items in an embodiment in accordance with techniques herein. The example 300 illustrates that work items for a data storage system may be generated by the GUI 210 (R1) and/or the lower layer 214 (R2). As described above, a work item may be a request generated in accordance with performing a task at a particular time or with respect to a task performed at scheduled intervals (e.g., every 24 hours), or may be a request generated in response to an on-demand user request (e.g., the work item is generated in response to the request and placed in the queue). In either case, the work item may be placed in the appropriate work queue for a data storage system, such as data storage system A (DS A) and its work queue 304. At some later point in time, the agent of DS A polls the computer system 102 for pending work item requests. In response, the pending work items for DS A are retrieved (308) from the queue 304 and transmitted (310) from 102 to DS A.

Figure 5:
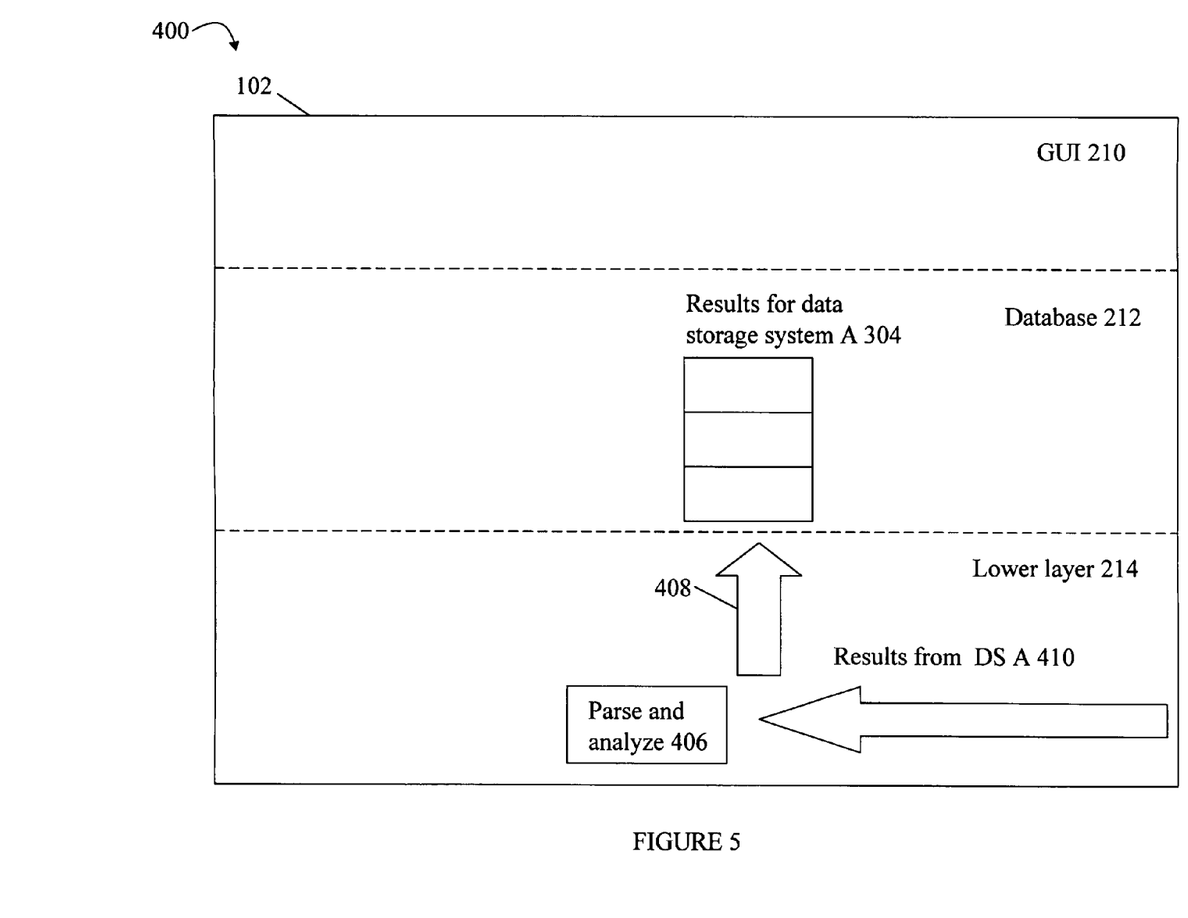

Referring to FIG. 5, shown is an example illustrating the data flow of work item results in an embodiment in accordance with techniques herein. The example 400 illustrates that results of DS A performing a work item request may be received (410) by the computer system 102. The results may be parsed and analyzed (406) and also stored (408) in the database 212.

Figure 6:
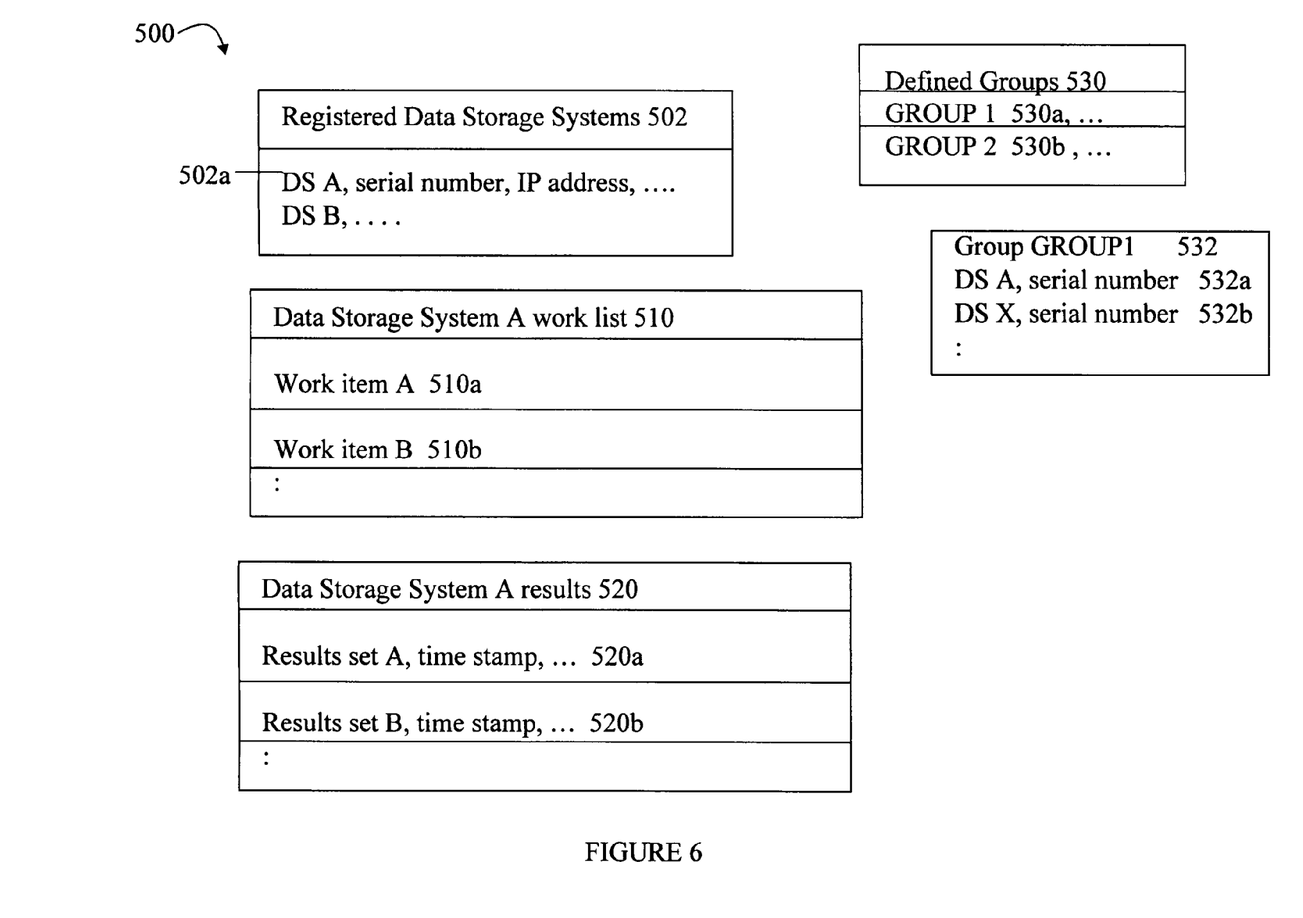
FIG. 6 is an example of information that may be stored in a database in an embodiment in accordance with techniques herein.

Referring to FIG. 6, shown is an example illustrating additional detail regarding information that may be stored in the database in an embodiment in accordance with techniques herein. The example 500 includes a registered data storage system table 502, a data storage system work list 510, a data storage results table 520, a defined groups table 530 and a group definition table 532. Element 502 provides additional detail 502a regarding information that may be stored for each registered data storage system. As illustrated by 502a, such information may include, for example, a string or named identifier (e.g., DS A), a serial number, and an IP address. The table 502 may include an entry or record of information as illustrated by 502a for each registered data storage system.

The table 510 is an example of a table that may exist for each registered data storage system, such as data storage system A (DS A), containing the pending work items for the data storage system. The table 520 is an example of a table that may exist for each registered data storage system and may include the results as reported by an agent for one or more work items.

It should be noted that, in response to an agent's polling request, an embodiment may transmit all pending work items or a maximum number of pending work items at a single time. The results provided by the agent may represent the results of collectively performing all the foregoing work items. The results may identify which portion of the results corresponds to a particular work item. Alternatively, rather than batch multiple pending requests, an embodiment may also choose to only transmit a single work item request at a time. For each set of results returned by the agent, a record may be included in the table 520 containing the results, a time stamp, and possibly other information.

The table 530 is an example of a table listing all currently defined groups of data storage systems. The table 530 may include an entry, such as 530a or 530b, for each defined group. Element 532 is an example of a table that may exist for each defined group having an entry in the table 530. The table 532 lists the current members of the named group and includes an entry (532a, 532b) for each member and information about each such member data storage system. For example, GROUP1 530a may be included in table 530. Table 532 may define that DS A and data storage system X (DS X) are members of GROUP 1.

Figure 7:
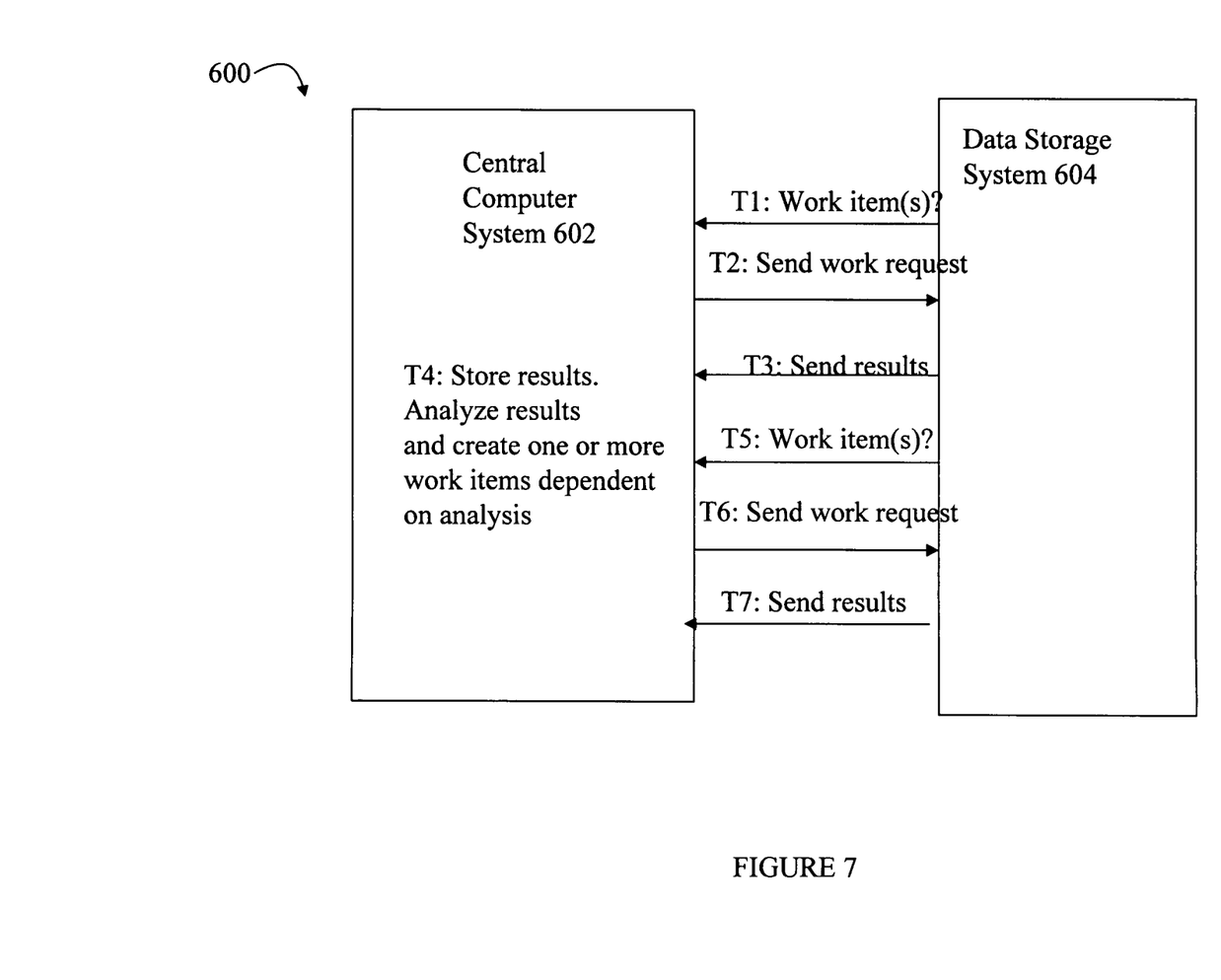

Referring to FIG. 7, shown is an example illustrating messages that may be transmitted between the central computer system 602 and a data storage system 604 in accordance with techniques described herein. The example 600 illustrates transmission T1 requesting pending work items for data storage system 604, T2 sending the one or more pending work items, and T3 transmitting the results of the data storage system 604 performing the pending work items. T4 illustrates the step performed in response to T3 where the results received are analyzed by 602 and stored in the database. Additionally, T4 in this example indicates that one or more subsequent work items for data storage system 604 are created and placed in the pending work item queue for system 604. The subsequent work items created may be dependent on the analysis of the results received in connection with T3. For example, as described above, the analysis may indicate an unhealthy state or problem with a device of 604. The subsequent work items may include a corrective action and collection of additional information after the corrective action is applied.

At a later point in time, the system 604 polls for further pending work items as illustrated by T5. In response as illustrated by T6, the subsequent work items are transmitted to the system 604 and corresponding results are then returned (T7). The subsequent work items may include, for example, applying a software update or patch, rebooting or reinitializing the data storage system. The results transmitted in connection with T7 may indicate, for example, the results of performing the corrective action. The results may include the results of installing the patch or software update, status information which is further analyzed by 602 to determine whether the system 604 is healthy or unhealthy, and the like. As mentioned elsewhere herein, a status of healthy for a data storage system, or with respect to a component (such as a drive) of the data storage system may be determined using any one or more indicators. For example, the status of drive as healthy or not may be determined based on one or more error conditions or alerts recorded for the drive, whether a data access (test read and/or write operation) can be performed, and the like. The status of a data storage system as healthy or not may be based on collective information of components thereof, such as whether a threshold number of drives are healthy, and whether the RAs, HAs, and the like, of the data storage system are healthy. For example, U.S. patent application Ser. No. 12/286,427, filed Sep. 29, 2008, TETREAULT, et al., SINGLE COMMUNICATION CONNECTION FOR MANAGING A SYSTEM WITH MULTIPLE SERVICE PROCESSORS, which is incorporated by reference herein, and U.S. patent application Ser. No. 12/286,442, filed Sep. 29, 2008, COX et al., CLIENT PROCESSING IN RESPONSE TO MANAGED SYSTEM STATE CHANGES, which is incorporated by reference herein, describe one aspect that may be used in connection with determining the health of a data storage system. Information regarding the foregoing may be gathered via work item requests using techniques described herein to characterize the health of the data storage system. As described herein, in response to a first analysis of first work item results indicating an unhealthy data storage system as described in the foregoing two patent applications, a subsequent work item request may be for the data storage system to take a corrective action (e.g., such as a command to reboot or reinitialize the data storage system) as an attempt to return the data storage system to a healthy state. The subsequent work item request may also report second work item results back to the central computer system characterizing the state of the data storage system after performing the corrective action. Second analysis of the second work item results may be performed to determine if any additional corrective actions may be taken, for example, if the data storage system state is still unhealthy. It should be noted that as described in the foregoing two patent applications, when the data storage system is in an unhealthy state, an embodiment may still provide for the agent 106 described herein to execute and perform processing as described herein so that such corrective actions may be taken.

Described above are techniques that may be used to obtain information regarding the state of a data storage system by issuing work item requests. The techniques herein may also be used to issue subsequent work item requests, including performing corrective actions based on analysis of previous work item results. The techniques herein may be used to automatically obtain information about data storage systems at a central location using a communication channel via the lower layer in communication with agents on data storage systems. The techniques herein provide for the agents on the data storage systems polling the central location for pending work item requests. In one embodiment, a work item request may include actively downloading a current version of a script from the central location to perform processing on the data storage system to gather information generally related to serviceability aspects of the data storage system. The techniques herein may be used to provide for automated serviceability across multiple data storage systems having connectivity to the central location. The techniques herein may be characterized as providing a proactive model and framework that can be used to automatically monitor the state of multiple data storage systems from a central location rather than wait to obtain information about one of the data storage systems when a problem is detected. The techniques herein may be used to provide an aggregate view of analyzed results across multiple data storage systems in connection with aspects of the systems which may be of importance with respect to serviceability, problem diagnosis and/or correction. For example, information regarding hardware and software versions which are currently installed on multiple data storage systems may be gathered using the techniques herein. At a later point in time, a problem may be discovered for a particular combination of hardware and a software version. A patch may be prepared to the software to correct this problem on one of the data storage systems. As a result, work item may also be created for each other data storage system having the same combination of hardware and software version in a proactive manner without waiting for such systems to report problems. The work item may provide for automatically installing the patch on the remaining data storage systems having the same hardware and software version.

An embodiment may implement the techniques herein using code executed by a computer processor. For example, an embodiment may implement the techniques herein using code which is executed by a processor of the data storage system. As will be appreciated by those skilled in the art, the code may be stored on the data storage system, or another component, on any type of computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for obtaining information about a data storage system comprising:
    booting the data storage system by executing boot code;
    determining, by said executing boot code, whether a flag has a first setting indicating that the data storage system is enabled for automated information gathering about said data storage system whereby, to facilitate the automated information gathering when the data storage system is enabled, the data storage system subsequently retrieves work items, performs processing for retrieved work items to gather information about the data storage system, and transmits gathered information about the data storage system, wherein the automated information gathering obtains data about the data storage system including problem information indicating hardware and/or software errors that have occurred on the data storage system over a time period;
    in response to determining that said flag has said first setting, performing processing for the automated information gathering, said processing for the automated information gathering comprising:
        executing an agent on the data storage system, wherein execution of the agent is not otherwise commenced in response to determining that said flag does not have said first setting, said agent being configured to communicate with a central location at predetermined time intervals;
        at a first predetermined time interval, sending a first message from said agent to the central location polling for a pending work item;
        determining whether there are any pending work items for the data storage system; and
        in response to determining that there are work items pending for the data storage system, performing first processing, said first processing including:
            sending, by said central location to the data storage system in response to the first message, a second message indicating whether there are any pending work items for the data storage system, said second message including at least one work item if there are any pending work items for the data storage system, said at least one work item describing second processing to obtain first information including said problem information about a state of the data storage system;
            performing, by the data storage system, said second processing; and
            sending, to the central location, work item results including said first information produced by performing said second processing.

2. The method of claim 1, wherein the flag is a hardware flag of the data storage system.

3. The method of claim 1, wherein the at least one pending work item is a request to execute code on the data storage system to obtain at least one data item about the state of the data storage system.

4. The method of claim 3, wherein the at least one pending work item includes a script for execution by the data storage system.

5. The method of claim 1, wherein said central location includes a system with a computer processor, said system including a plurality of software layers, said plurality of software layers including a first interface layer that interfaces with a user, a second data container layer that stores data, and a third layer including code facilitating communications with said agent.

6. The method of claim 5, wherein said data container layer is used for storing data including a work item queue for a plurality of registered data storage systems including said data storage system, and results of performing work items where said results are reported from agents of said registered data storage systems.

7. The method of claim 6, wherein said data container layer is used for storing data including information identifying each of the plurality of registered data storage systems.

8. The method of claim 6, wherein said data container layer is used for storing data including one or more defined data storage system groups, each of said defined data storage system groups including a group definition identifying which of said plurality of registered data storage system are members of said each defined data storage system group.

9. The method of claim 6, wherein said first interface layer includes code that generates a work item in response to a user-initiated request and places said work item on a work item queue in said data container layer.

10. The method of claim 6, wherein said third layer includes code that automatically generates a work item and places said work item on a work item queue in said data container layer.

11. The method of claim 10, wherein said work item is included on a first work item queue for said data storage system and is generated in response to analyzing first results returned by said agent executing on the data storage system, said first results produced by said data storage system performing processing for one or more other work items previously sent to, and processed by, said data storage system.

12. The method of claim 11, wherein analyzing said first results is performed by the central location and indicates a problem with the data storage system, and said first work item includes a request for the data storage system to automatically perform a corrective action in accordance with said analyzing said first results.

13. The method of claim 12, wherein said corrective action includes at least one of: reboot the data storage system, reinitialize the data storage system, install a software patch on the data storage system, and install a different version of software on the data storage system.

14. The method of claim 5, wherein said third layer receives messages from agents inquiring whether there are any pending work items for data storage systems, retrieves one or more pending work items from said data container layer for a specific data storage system as requested by an agent on said specific data storage system, and sends said one or more pending work items to a the agent on said specific data storage system.

15. The method of claim 1, wherein said second processing for said at least one work item includes obtaining information about one or more of: status of a device of the data storage system, a computer processor which is a service processor of the data storage system, a version of software installed on the data storage system, a patch installed on the data storage system, and a hardware characteristic about a device of the data storage system.

16. The method of claim 1, wherein said second processing for said at least one work item includes obtaining information about one or more of logins to said data storage system, usage information about a device of the data storage system, usage information about a computer processor of the data storage system, errors or alerts received for a device of the data storage system, whether a device is available for use, and device age.

17. The method of claim 1, wherein said data storage system is registered with said central location as having a license for servicing said data storage system.

18. A computer readable medium comprising executable code stored thereon for obtaining information about a data storage system, the computer readable medium comprising executable code stored thereon that:
    boots the data storage system by executing boot code;
    determines, by said executing boot code, whether a flag has a first setting indicating that the data storage system is enabled for automated information gathering about said data storage system whereby, to facilitate the automated information gathering when the data storage system is enabled, the data storage system subsequently retrieves work items, performs processing for retrieved work items to gather information about the data storage system, and transmits gathered information about the data storage system, wherein the automated information gathering obtains data about the data storage system including problem information indicating hardware and/or software errors that have occurred on the data storage system over a time period;
    in response to determining that said flag has said first setting, performs processing for the automated information gathering, said processing for the automated information gathering comprising code that:
        executes an agent on the data storage system, wherein execution of the agent is not otherwise commenced in response to determining that said flag does not have said first setting, said agent being configured to communicate with a central location at predetermined time intervals;
        at a first predetermined time interval, sends a first message from said agent to the central location polling for a pending work item;
        determining whether there are any pending work items for the data storage system; and
        in response to determining that there are work items pending for the data storage system, performs first processing, said first processing including executable code that:
            sends, by said central location to the data storage system in response to the first message, a second message indicating whether there are any pending work items for the data storage system, said second message including at least one work item if there are any pending work items for the data storage system, said at least one work item describing second processing to obtain first information including said problem information about a state of the data storage system;
            performs, by the data storage system, said second processing; and
            sends, to the central location, work item results including said first information produced by performing said second processing.

19. The computer readable medium of claim 18, wherein the flag is a hardware flag of the data storage system.

20. The computer readable medium of claim 18, wherein the at least one pending work item is a request to execute code on the data storage system to obtain at least one data item about the state of the data storage system.

\* \* \* \* \*